/ United States Patent (12)
Linkohr

(10) Patent No.: US 7,146,274 B2
(45) Date of Patent: Dec. 5, 2006

(54) PROCESS FOR UPDATING MAP DATA AND NAVIGATION SYSTEM

(75) Inventor: Jochen Linkohr, Korb (DE)

(73) Assignee: DaimlerChrysler AG, Stuttgart (DE)

( * ) Notice: Subject to any disclaimer, the term of this patent is extended or adjusted under 35 U.S.C. 154(b) by 29 days.

(21) Appl. No.: 10/506,314

(22) PCT Filed: Jan. 16, 2003

(86) PCT No.: PCT/EP03/00393

§ 371 (c)(1),
(2), (4) Date: Mar. 3, 2005

(87) PCT Pub. No.: WO03/074972

PCT Pub. Date: Sep. 12, 2003

(65) Prior Publication Data

US 2005/0149257 A1    Jul. 7, 2005

(30) Foreign Application Priority Data

Mar. 1, 2002    (DE) ............................... 102 09 173

(51) Int. Cl.
G01C 21/30    (2006.01)
G01S 5/14    (2006.01)
(52) U.S. Cl. .................. 701/208; 701/209; 701/212; 701/213; 342/357.13
(58) Field of Classification Search ........ 701/200–213; 342/357.01–357.17; 340/990–995.1; 707/100, 707/101, 102, 104.1
See application file for complete search history.

(56) References Cited

U.S. PATENT DOCUMENTS

| 6,128,571 | A | 10/2000 | Ito et al. | |
| 6,473,770 | B1* | 10/2002 | Livshutz et al. | 707/103 R |
| 6,525,690 | B1* | 2/2003 | Rudow et al. | 342/357.13 |
| 6,529,159 | B1* | 3/2003 | Fan et al. | 342/357.09 |
| 6,721,236 | B1 | 4/2004 | Eschke et al. | |
| 6,873,905 | B1* | 3/2005 | Endo et al. | 701/202 |
| 6,937,936 | B1* | 8/2005 | Nimura | 701/208 |

FOREIGN PATENT DOCUMENTS

| DE | 197 46 597 A | 4/1999 |
| EP | 0 767 358 A | 4/1997 |
| EP | 1 221 587 A | 7/2002 |

* cited by examiner

Primary Examiner—Richard M. Camby
(74) Attorney, Agent, or Firm—Akerman Senterfitt; Stephan A. Pendorf

(57) ABSTRACT

The invention concerns a process for updating map data of a navigation system in a vehicle, wherein the navigation system includes a digital map of a road and path network as well as a digital supplemental map, wherein in the digital supplemental map data supplemental to the road and path network are stored. The process includes the steps:
  a) producing differential data for an updated digital map, using the digital map,
  b) replacing the digital map in the vehicle with the updated digital map,
  c) updating the digital supplemental map in the vehicle using the differential data.

9 Claims, 3 Drawing Sheets

PROCESS FOR UPDATING MAP DATA AND NAVIGATION SYSTEM

CROSS REFERENCE TO RELATED APPLICATION

This application is a national stage of PCT/EP03/00393 filed 16 Jan. 2003 and based upon DE 102 09 173.0 filed 1 Mar. 2002 under the International Convention.

BACKGROUND OF THE INVENTION

1. Field of the Invention

The invention concerns a process for updating positional data. It further concerns a navigation system according to the precharacterizing portion of claim 5.

2. Related Art of the Invention

One such navigation system with a digital map of a road and path network and a digital supplemental map is described in EP 0 330 787 B2. The digital map is stored on a CD. The digital supplemental map includes local or theme type data to supplement the digital map, and is brought into the vehicle by a portable storage medium and/or wireless means. For navigational guidance, both the digital map as well as the digital supplemental map are used. To use the digital map and the digital supplemental map for navigational guidance, differential data is produced, which describes the changes in the digital supplemental map relative to the digital map. The digital map on CD is static. Changes and updates of the data of the road and path network is carried out by an updating of the digital supplemental map.

SUMMARY OF THE INVENTION

It is the task of the invention to provide a process which makes it possible to update the digital map of a road and path network in the vehicle. Further, a navigation system particularly suitable for carrying out the process is to be provided.

This task is solved, with regard to the process, by the characterizing features of claim 1 and, for the navigation system, by the characterizing features of claim 5. The dependent claims concern advantageous developments and further advancements of the invention.

The invention is based upon the idea that, in the importing of updates for the digital map of a road and path network in a navigation system, the digital supplemental map is likewise updated using differential data. The digital map of the road and path network is usually stored statically on a data carrier and is updated by introducing a new data carrier with a thereupon stored updated digital map into the navigation system. The digital map is supplemented with data from a digital supplemental map, which stores individual locationally relevant attributes of the road and path network of the digital map. The locally relevant attributes are based on elements of the road and path network stored in the digital map. The elements of the road and path network stored in the digital map include, for example, edges and/or bends and/or other elements. The attributes stored in the digital updating map can be changed for example by the driver and/or by data transmitted by a geographically fixed center and/or automatically by the vehicle system. If the digital map changes, upon which the attributes stored in the supplemental map are based, then, among other things, the data of the supplemental map is no longer suited for use. This can be the case for example when an edge and/or a bend and/or other elements, upon which an attribute is based or indexed, becomes omitted in the updated version of the digital map, or if an identifier of the edge and/or the bend and/or the other elements has changed. In that case, the attributes of the supplemental map can no longer be correlated with the elements of the digital map.

For updating the digital map, differential data is established in step a) of the process, which produces the differences between the updated digital map and the digital map previously employed in the vehicle. The differential data can be established for example by the producer of the digital map and the updated digital map. In a preferred embodiment of the invention, the differential data is transmitted or provided to the client, the vehicle user, along with the updated digital map. The differential data are then imported into the vehicle by the same way as the updated digital map, for example, via a portable storage medium such as, for example, a CD-ROM and/or a flashcard and/or a DVD. The differential data can also be transmitted from a geographically fixed center. The generating of the differential data can alternatively or additionally occur for example in a geographically fixed center, to which the data of the digital map and the updated digital map are transmitted by the map manufacturer. The transmission of the differential data into a vehicle can occur wireless from the geographically fixed center, for example via a mobile radio network or a broadcast medium such as for example DAB (digital audio broadcast) and/or DVB (digital video broadcast). The transmission of the differential data into the vehicle can also occur by wire from the geographically fixed center, for example via a network and/or a data transmission line in a repair facility and/or a service station.

In step b) of the process the digital map in the vehicle is replaced by the updated digital map. Thereby, the basis of the elements can change, to which the attributes in the supplemental map are indexed.

By updating the supplemental map using the differential data in step c) of the process, the supplemental map is converted, so that the resulting updated supplemental map can be employed in combination with the updated digital map. Thus, in the differential data, for example those identifiers used in the updated digital map which have changed with regard to the identifiers used in the previous digital map are stored or recorded. There can also be recorded in the differential data those identifiers that are not to be replaced by new identifiers, but rather are to be cancelled without substitution. The supplemental map can accordingly be updated by use of the differential data, so that the attributes of the supplemental map, following conversion, can again be clearly correlated again to meaningful recognition or identification of bends and/or edges and/or other elements of the digital map. Preferably, the conversion of the digital supplemental map into the updated digital supplemental map using the differential data occurs in the vehicle. This has the advantage, that only the relatively small data quantity of the differential data must be supplementally imported into the vehicle; the digital supplemental map, which is individually produced by the driver and/or for the vehicle, however, can remain in the vehicle and is immediately employable following the conversion.

The attributes stored in the digital supplemental map supplement the digital map with regard to local data or points of interest, for example, as tour guides for an area which is the navigational goal of the vehicle. The digital supplemental map can however also contain information as attributes, which are necessary for the comfort functions of the navigation system, for example providing information with regard to particular attractions relevant to certain themes. The digital map can alternatively or additionally contain safety relevant information as attributes, for example, road curvature, angles of inclination, etc.

In the vehicle the data carrier with the digital map is checked for example by the navigation system, and it is determined whether the version of the digital map necessitates a conversion of the digital supplemental map. This checking can occur for example according to the process described in DE 100 37 397 A1 and/or a similar process. In the case that it is determined in the vehicle, for example by the navigation system, that an updating of the digital supplemental map is necessary, then a request is made for differential data for the updating the digital supplemental map.

The request for the differential data, in order to update the digital supplemental map, can occur preferably for example thereby, that the differential data are requested and read in from the inserted data carrier of the digital map. Preferably the requisitioning can also be comprised therein, that the driver is prompted by acoustic and/or optical output, to insert the portable data carrier with the differential data. If the data carrier with the differential data is introduced, then the navigation system carries out the conversion of the digital supplemental map. This embodiment of the invention has the advantage, that for updating of the digital supplemental map, no communication link need be established with the center, and thus it is not associated with any communication costs. If no data carrier with differential data is present in the vehicle, then there is the possibility for the driver to request the differential data from the center and to have the differential data transmitted to him wirelessly. This embodiment of the invention has the advantage, that even when no differential data is present in the vehicle, the digital supplemental map can be updated without great expense for the driver.

In a further advantageous embodiment of the invention the requisitioning of the differential data occurs directly by a request to the center, from which the differential data is transmitted wirelessly. This has the advantage, that the driver need not be informed regarding the transpiration of the conversion, since it occurs completely automatically.

BRIEF DESCRIPTION OF THE DRAWINGS

Preferred embodiments of the invention are described in the following on the basis of associated figures. There is shown respectively in schematic representation.

DETAILED DESCRIPTION OF THE INVENTION

In the figures the same reference number is used for corresponding elements.

Figure 1:
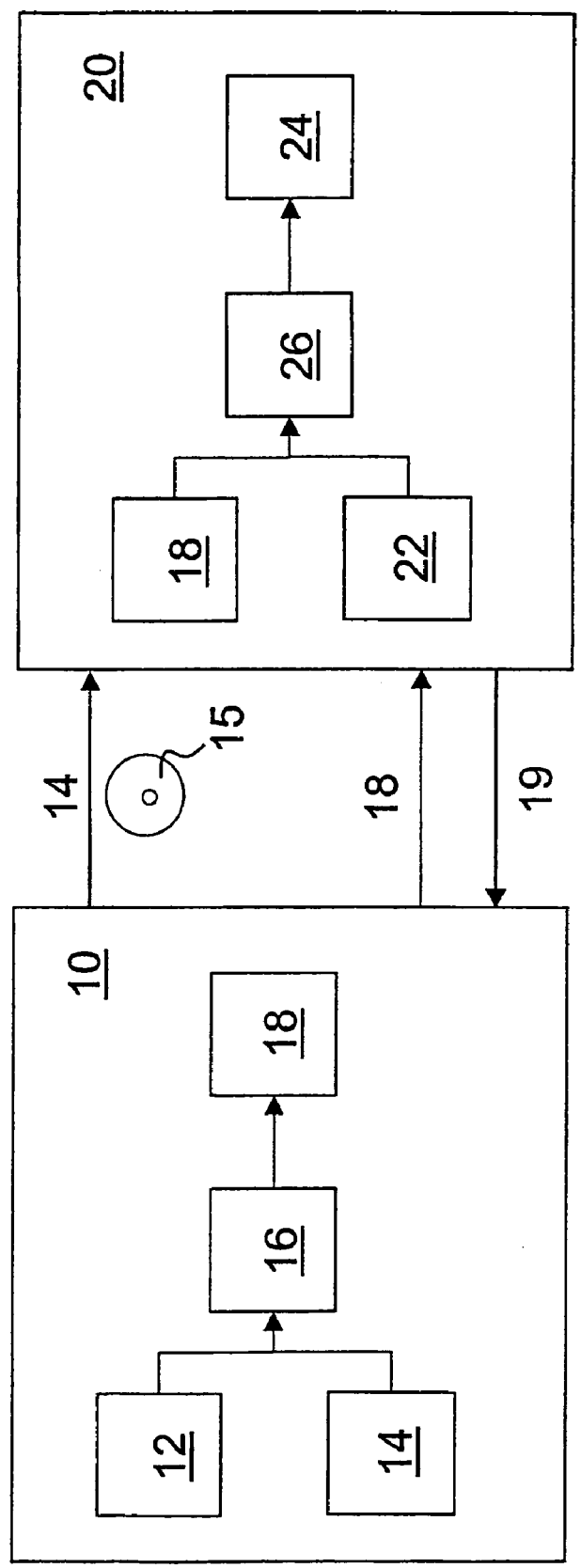
FIG. 1 a schematic representation of a process for updating map data of a digital supplemental map 22, FIG. 2 a schematic representation of a navigation system in a vehicle with digital map 12 and digital supplemental map 22, and FIG. 3 a schematic representation of a navigation system in a vehicle with updated digital map 14 and updated digital supplemental map 24.

FIG. 1 schematically shows a process for updating map data of a navigation system. In the center 10 differential data 18 are produced in a computer 16 using a digital map 12 and an updated digital map 14, which provide the differences between the digital map 12 and the updated digital map 14. The updated digital map 14 is introduced into the vehicle 20 in a conventional manner, for example via a CD-ROM 15. In the vehicle 20 the computer 26 of the navigation system recognizes that an update of the digital supplemental map 22 is necessary and transmits a request 19 to the center 10. The center thereupon transmits the differential data 18 to the vehicle 20. In the vehicle 20 then, using the differential data 18 and the digital supplemental map in the computer 26, produces the updated supplemental map 24.

Figure 2:
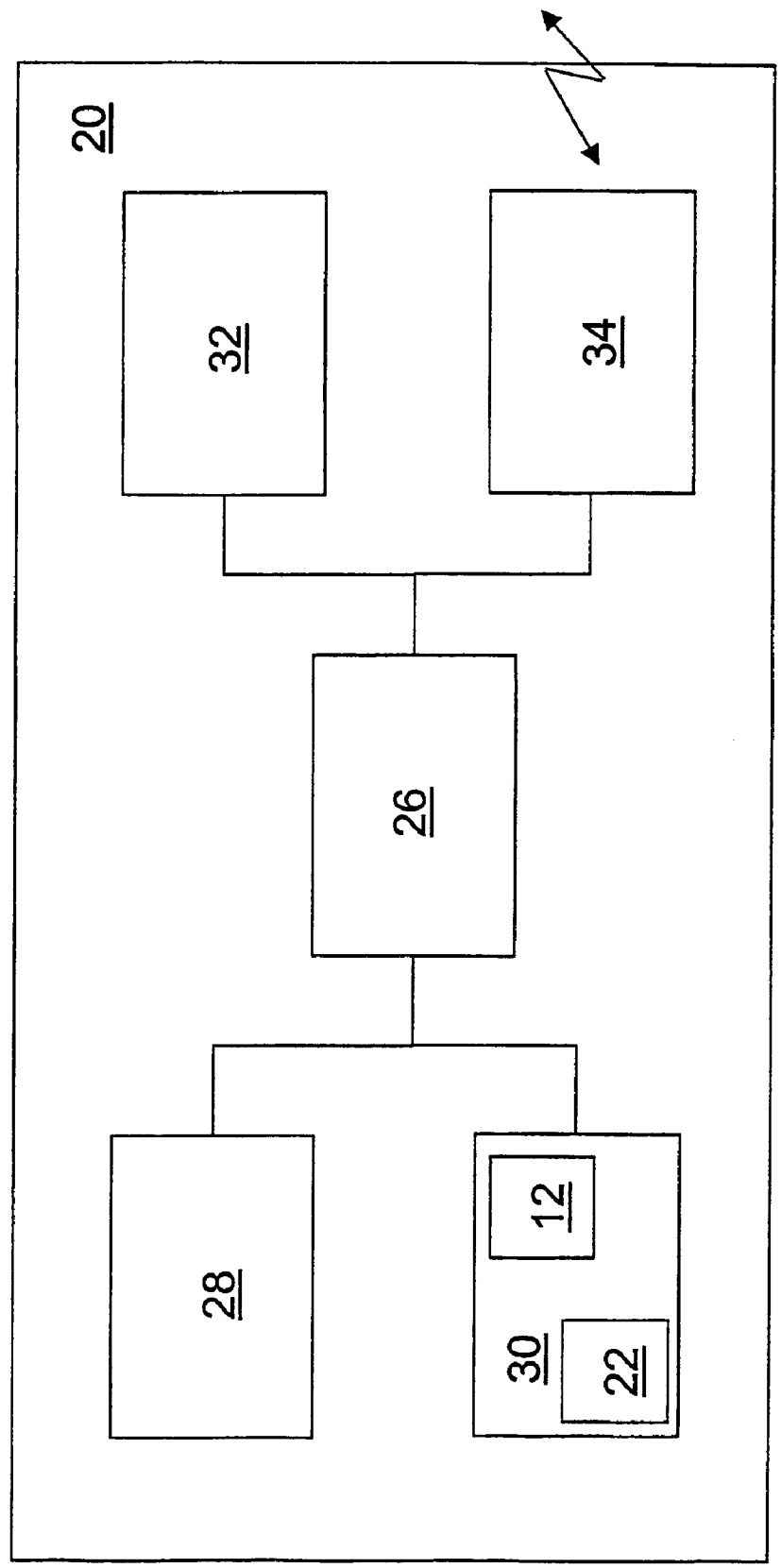

The navigation system in vehicle 20 shown schematically in FIG. 2 includes the computer 26, vehicle sensors 28, a memory 30, in which the digital map 12 and the digital supplemental map 22 are stored, an input/output unit 32 and a communication device 34 for wireless communication. The vehicle sensors 28 include, for example, devices for determining position, such as for example a GPS-receiver, magnetic field sensor, trip meter, rotation angle sensor, steering angle sensor. The input/output unit 32 makes possible user input such as for example via a keyboard, a touch sensitive display screen and/or a voice activated unit. The input/output unit 32 allows additional outputs to the user in optical form, for example via a display unit, or in acoustic form, for example via speech output.

Figure 3:
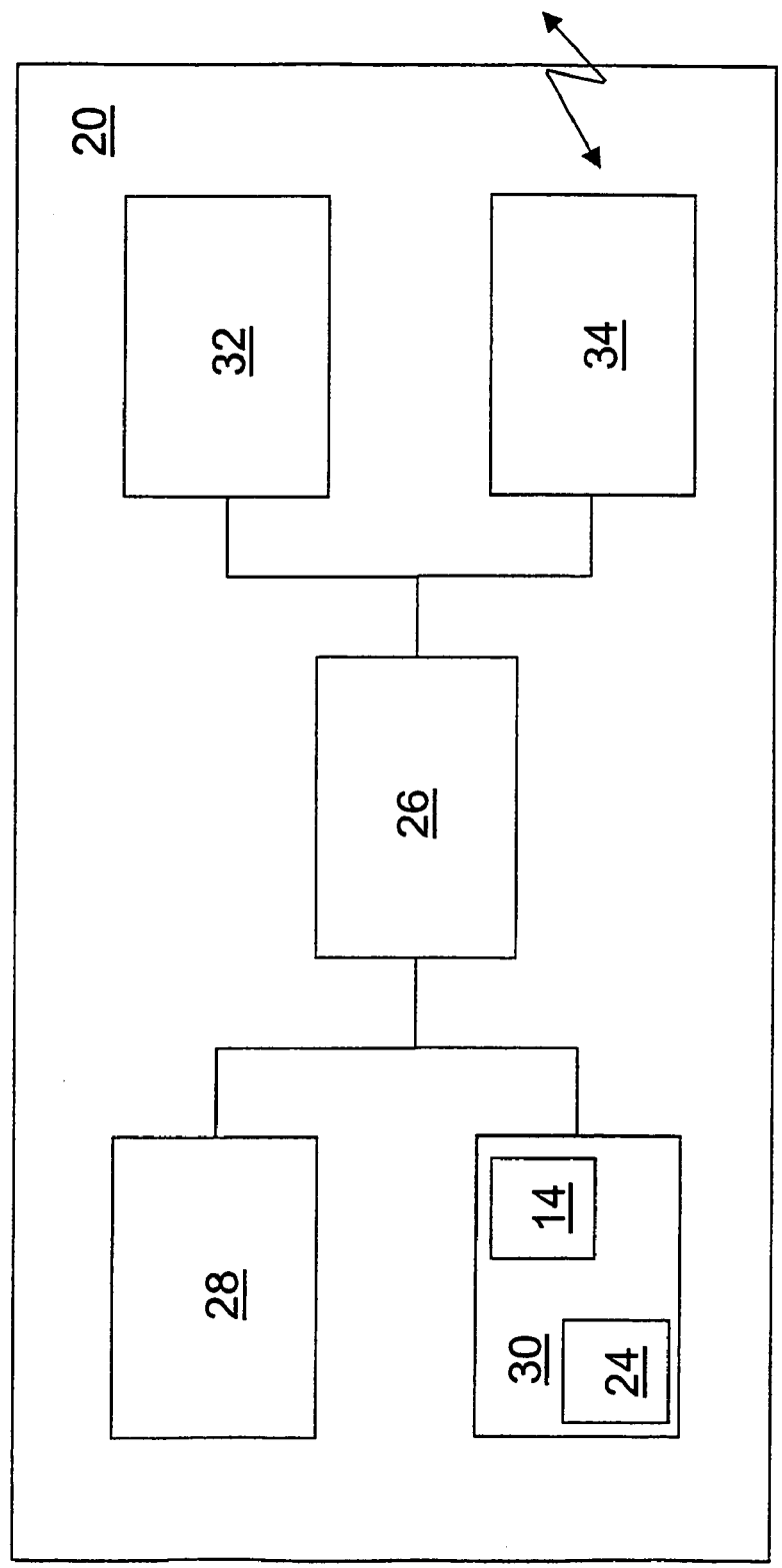

In FIG. 3 the navigation system is schematically shown following updating of the digital map 12 to the updated digital map 14 and the conversion of the digital supplemental map 22 to the updated digital supplemental map 24.

The invention claimed is:

1. A process for updating map data of a navigation system in a vehicle (20), wherein the navigation system includes a digital map (12) of a road-and-path network as well as a digital supplemental map (22), wherein in the digital supplemental map (22) data supplemental to the road-and-path network is stored, comprising the steps
   a) producing differential data (18) for an updated digital map (14) using the digital map (12),
   b) replacing the digital map (12) in the vehicle with the updated digital map (14),
   c) updating the digital supplemental map (22) in the vehicle using the differential data (18).

2. A process according to claim 1, wherein the differential data (18) is produced in a geographically fixed center (10).

3. A process according to claim 1, wherein the updated digital map (14) and/or the differential data (18) is introduced into the vehicle (20) using a portable storage medium (15) and/or a portable terminal.

4. A process according to claim 1, wherein the updated digital map (14) and/or the differential data (18) are transmitted wirelessly to the vehicle.

5. A navigation system for a vehicle including a digital map of a road-and-path network and a digital supplemental map in which data supplemental to the road-and-path network is stored, wherein the onboard system is adapted to recognize in the vehicle (20) whether the digital map (12) has been replaced with an updated digital map (14), and as needed requests differential data (18) for updating the digital supplemental map (22), wherein the differential data (18) is produced using the digital map (12) and the updated digital map (14).

6. A navigation system according to claim 5, wherein the driver is prompted to make the differential data (18) available to the navigation system.

7. A navigation system according to claim 5, wherein the differential data (18) is requisitioned by the driver and/or automatically from a geographically fixed center (10).

8. A navigation system according to claim 5, wherein wherein the updated digital map (14) and/or the differential data (18) is introduced into the vehicle (20) via a portable storage medium (15) and/or a portable terminal.

9. A navigation system according to claim 5, wherein wherein the updated digital map (14) and/or the differential data (18) is introduced into the vehicle (20) wirelessly and/or by wire.

* * * * *